United States Patent
Nelson et al.

(10) Patent No.: US 10,219,441 B2
(45) Date of Patent: Mar. 5, 2019

(54) MULTI-POSITION LOCK FOR PRUNING DEVICE

(71) Applicant: Barnel International, Inc., Portland, OR (US)

(72) Inventors: Linn E Nelson, Portland, OR (US); Karl H Zeller, Portland, OR (US)

(73) Assignee: Barnel International, Inc., Portland, OR (US)

( * ) Notice: Subject to any disclaimer, the term of this patent is extended or adjusted under 35 U.S.C. 154(b) by 0 days.

(21) Appl. No.: 15/877,807

(22) Filed: Jan. 23, 2018

(65) Prior Publication Data

US 2018/0206409 A1 Jul. 26, 2018

Related U.S. Application Data

(60) Provisional application No. 62/450,006, filed on Jan. 24, 2017.

(30) Foreign Application Priority Data

Feb. 15, 2017 (TW) .............................. 106104900 A (51) Int. Cl.
  *A01G 3/02* (2006.01)
(52) U.S. Cl.
  CPC .................... *A01G 3/021* (2013.01)
(58) Field of Classification Search
  CPC ............. A01G 3/02; A01G 3/021; A01G 3/04
  USPC .......................................................... 30/262
  See application file for complete search history.

(56) References Cited

U.S. PATENT DOCUMENTS

| 4,341,016 | A | * | 7/1982 | Harrison | .................. A01G 3/02 30/262 |
| 8,079,150 | B2 | * | 12/2011 | Huang | .................... B26B 13/16 30/254 |
| 8,549,757 | B2 | * | 10/2013 | Wu | ........................ B26B 13/16 30/194 |
| 9,003,667 | B2 | * | 4/2015 | Huang | ..................... A01G 3/02 30/254 |
| 9,484,539 | B2 | * | 11/2016 | Lee | ........................ C07C 255/52 |
| 9,572,301 | B2 | * | 2/2017 | Chou | ..................... A01G 3/021 |
| 2007/0266568 | A1 | * | 11/2007 | Lin | ........................... A01G 3/02 30/134 |
| 2008/0184567 | A1 | * | 8/2008 | Jou | ........................... A01G 3/02 30/262 |
| 2018/0206409 | A1 | * | 7/2018 | Nelson | ................... A01G 3/021 |

FOREIGN PATENT DOCUMENTS

| TW | 365110 B | 7/1999 |
| TW | M300965 U | 5/2006 |
| TW | M300031 U | 11/2006 |
| WO | 2016141979 A1 | 9/2016 |

* cited by examiner

*Primary Examiner* — Hwei-Siu C Payer
(74) *Attorney, Agent, or Firm* — patenttm.us (57) ABSTRACT

A multi-position lock for a pruner or secateur comprises a movable selector for selection between a locked condition for the blades of the pruner or secateur and one or more degree of opening positions for the blades. A typical example allows locked, maximum half open or maximum fully opened operation of the pruner or secateur.

12 Claims, 9 Drawing Sheets

MULTI-POSITION LOCK FOR PRUNING DEVICE

CROSS-REFERENCE TO RELATED APPLICATIONS

This application claims the benefit of U.S. Provisional Patent Application Ser. No. 62/450,006, filed Jan. 24, 2017, titled "MULTI-POSITION LOCK FOR PRUNING DEVICE" the entirety of which is incorporated herein by reference.

BACKGROUND

This disclosure relates to agricultural, arborist or landscape tools and the like, and more particularly for a multi-position adjustment for pruning devices to lock and define the degree of opening for the device.

When using a hand pruner or secateur, depending on the size of a user's hand and the size of the items being cut, the maximum amount that the pruner or secateur opens can be a factor in user fatigue and ease of operation. For a user with a smaller hand size, having a pruner or secateur that does not open as widely can sometimes be helpful, whereas a user with a larger hand size might desire a pruner or secateur that opens more widely. For pruning larger size items, a wider opening can also be desirable.

Having a pruner or secateur that allows adjustment of the opening size can be desirable.

Also, when the pruner or secateur is not in use, being able to lock the pruner or secateur in a closed position can be helpful, to avoid damage to the cutting blades or to minimize chance of injury to the user.

SUMMARY

In accordance with the disclosure, a locking mechanism is provided that allows locking of the pruner or secateur and also allows adjustment of the maximum amount that the pruner or secateur blades will open during use.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises an adjustable lock mechanism for allowing locking of a pruner or secateur in a closed position or for controlling the amount a pruner or secateur jaw will open during use.

Figure 1:
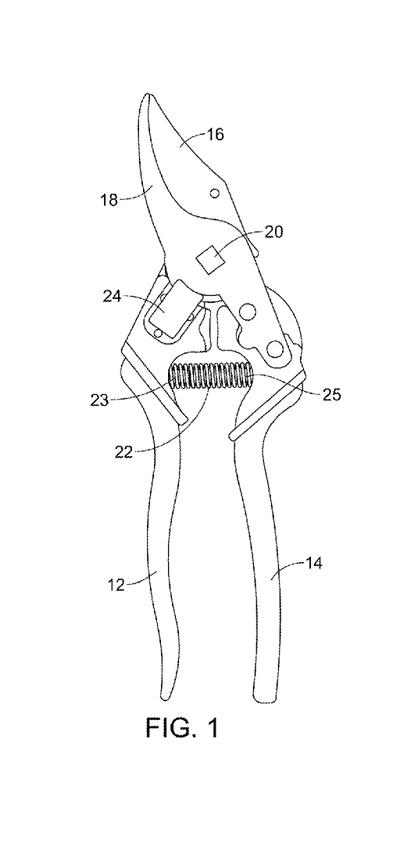
FIG. 1 is a view of a pruner or secateur in the fully closed lock position.
Figure 2:
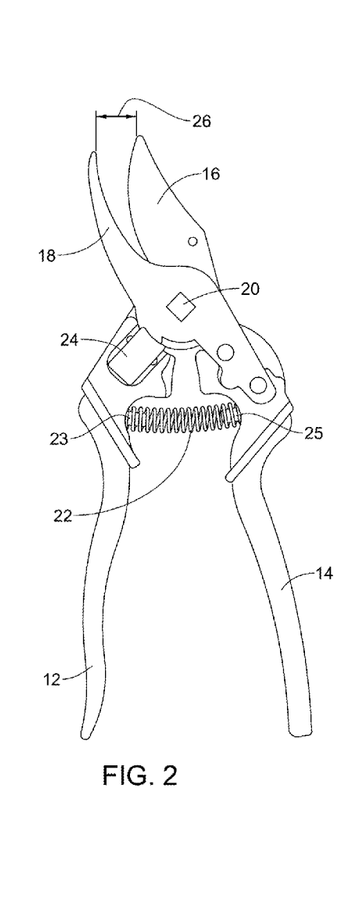
FIG. 2 is a view of the pruner or secateur of FIG. 1 in the partially open lock position.
Figure 3:
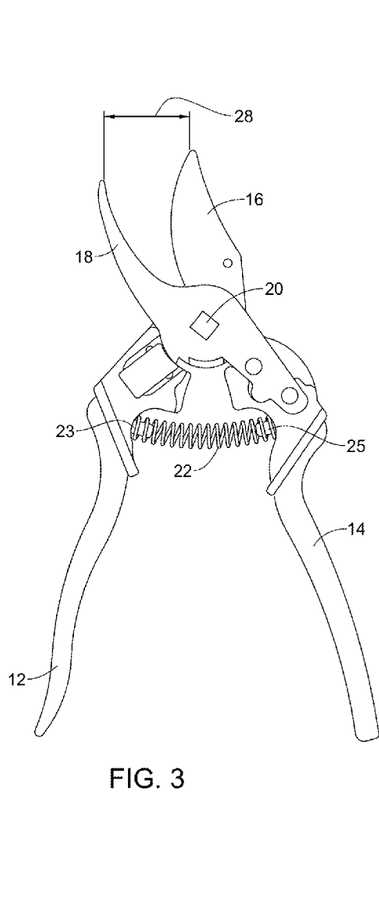
FIG. 3 is a view of the pruner or secateur of FIG. 1 in a fully open lock position.

Referring to FIGS. 1-3, views of a pruner or secateur in a fully closed, partially open and fully open position, the multi-position lock allows a pruner or secateur to be locked closed as shown in FIG. 1, or to open to varying degrees as shown in FIGS. 2 and 3. The pruner or secateur comprises left and right handles 12, 14, carrying cutting members 16 and 18 thereon, allowing opening and closing of the jaws by operation of the handles, by pivoting on axis 20. The pivoting mechanisms are omitted from the present drawings. A spring member 22 (omitted in most drawings) mounted on spring mount tabs 23, 25, provides bias to urge the jaws toward the open position in absence of squeezing of the handles by a user or locking of the pruner or secateur. A slide switch 24 operates as a lock control to enable the pruner or secateur to be locked closed as in FIG. 1, or adjusted to allow a varying degree of maximum opening of the jaws. In the illustrated embodiment, there are 2 maximum opening positions provided, partially open amount 26 as in FIG. 2, or fully open amount 28 as in FIG. 3. Other embodiments provide more than 2 options of maximum opening amounts as desired for more options of adjustment of opening control.

Figure 4:
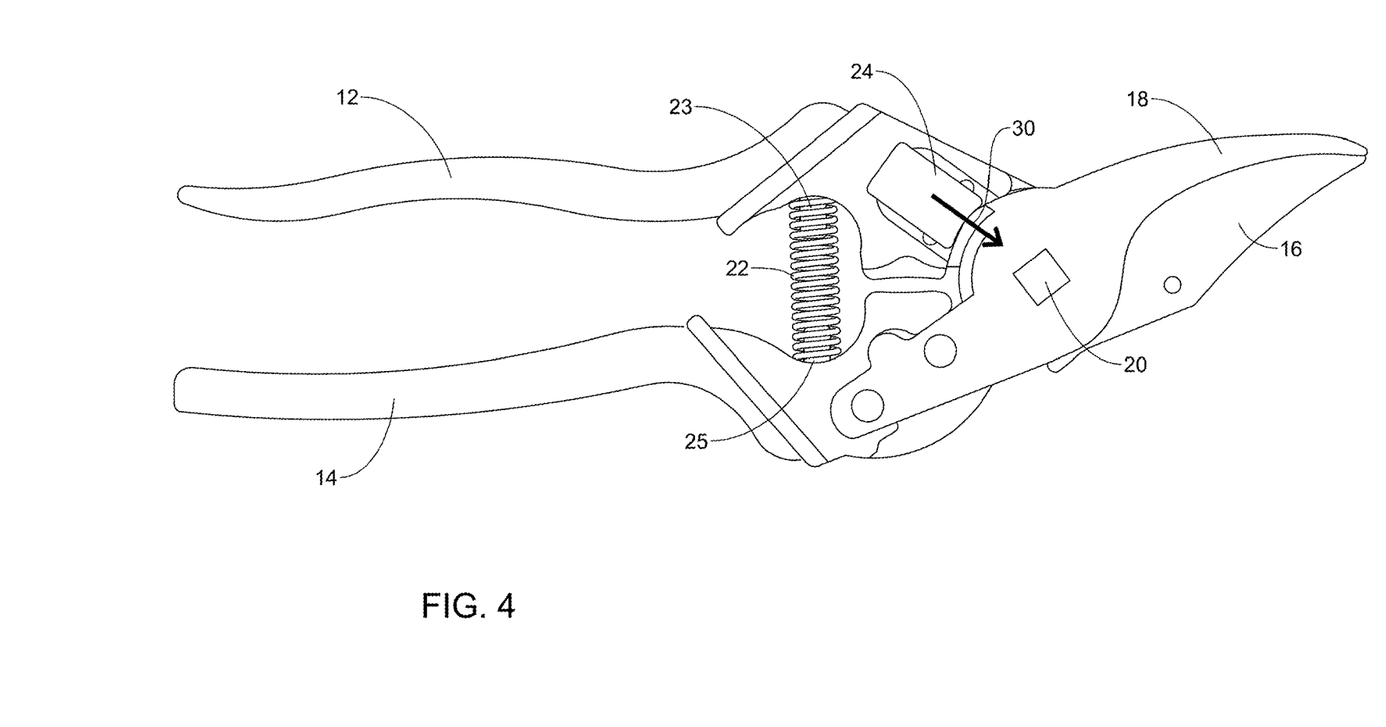
FIG. 4 is a view illustrating movement of the lock control towards the partially open or locked positions.
Figure 5:
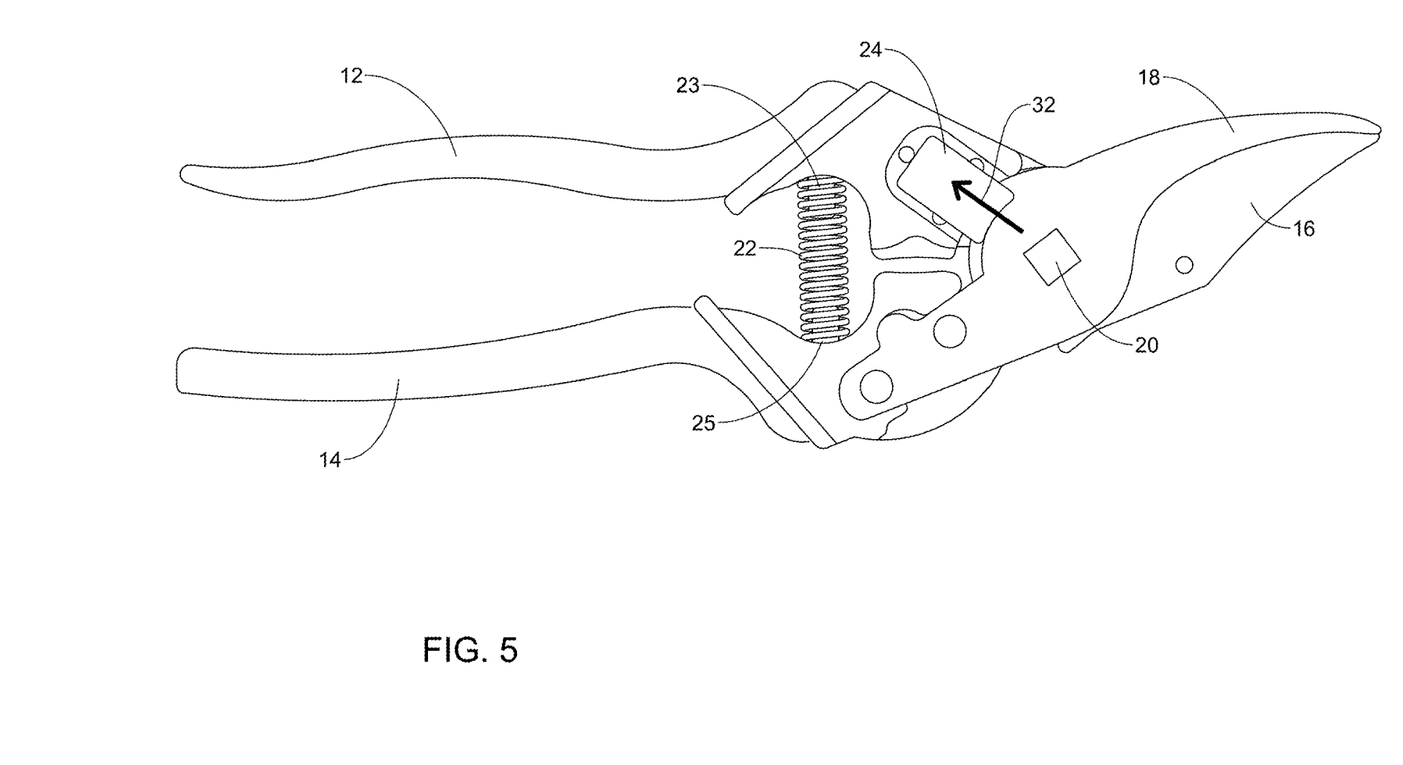
FIG. 5 is a view illustrating movement of the lock control towards the partially or fully open position.

Referring to FIGS. 4 and 5, views illustrating movement of the lock control towards the fully locked position (FIG. 4) or fully open position (FIG. 5), lock control slide switch 24 is slidable from the open position toward the blade portion 18 in the direction of arrow 30, or away from the blade portion 18 in the direction of arrow 32. When fully moved in the direction of arrow 30, the pruner or secateur is moved from the fully openable configuration of FIG. 4 to a locked configuration. When moved either partially or fully in the direction of arrow 32, the pruner or secateur is moved from the fully locked configuration of FIG. 5 to a partially or fully openable configuration.

Figure 6:
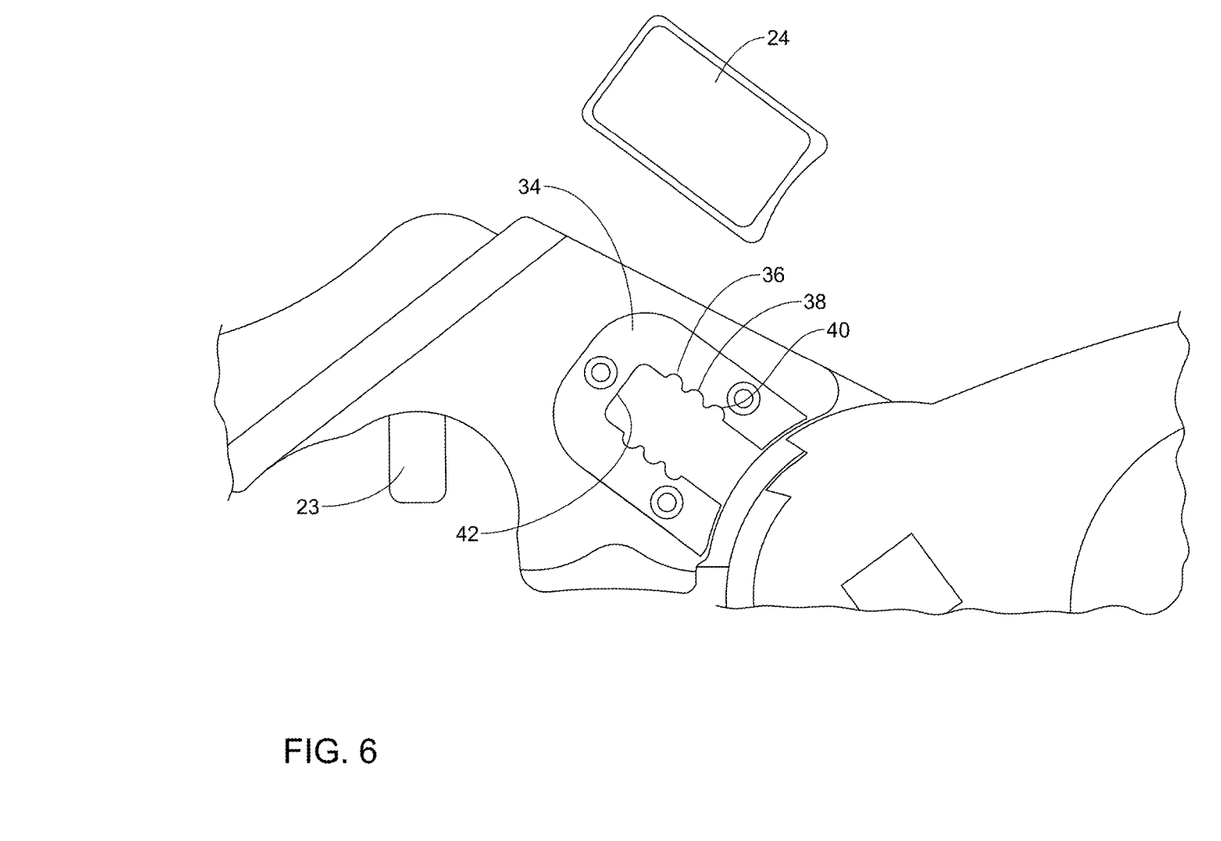
FIG. 6 is a partial exploded top view showing adjustment components in the pruner or secateur handle.
Figure 7:
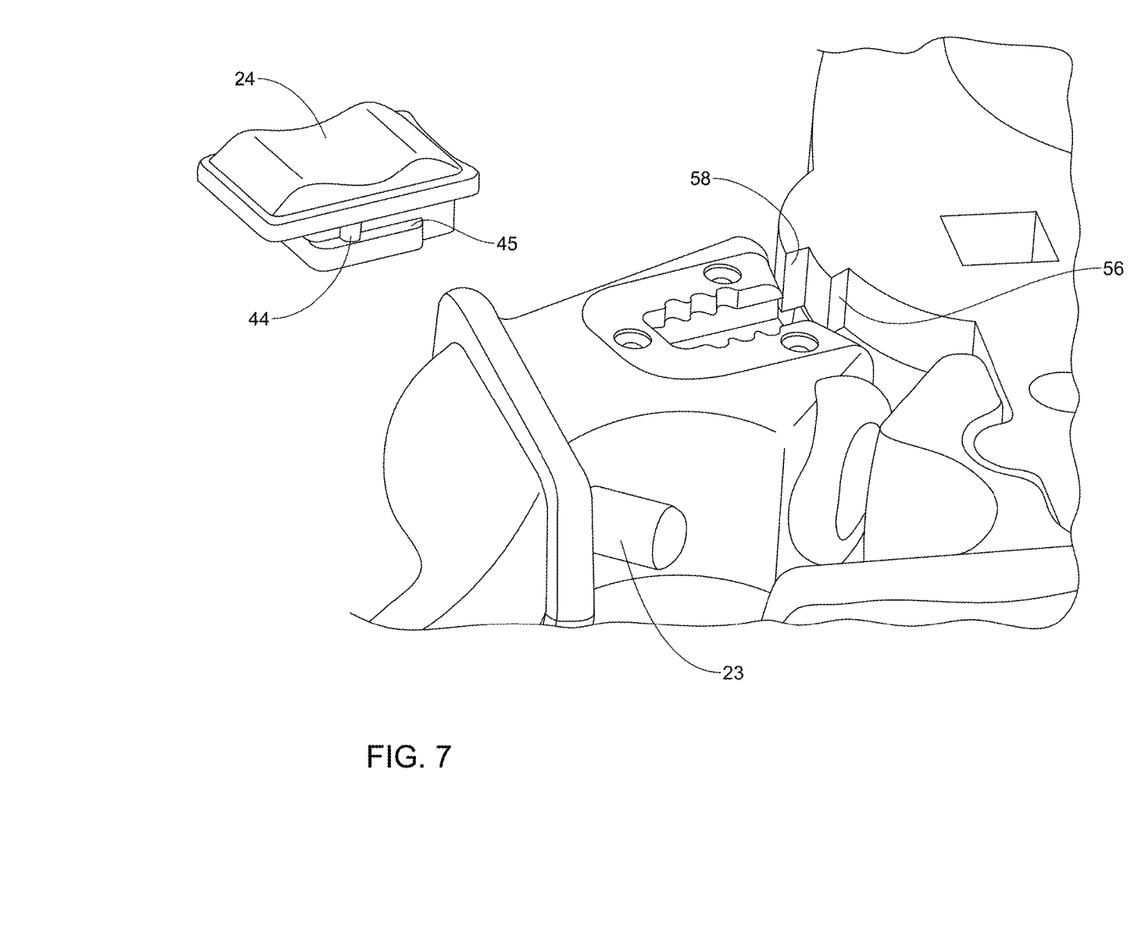
FIG. 7 is a partial exploded perspective view showing interaction of the lock control with the pruner or secateur handle components.

FIG. 6 is a partial exploded view with the lock control slide switch 24 removed, revealing an anchor component 34 defined in handle 12. The anchor component defines three anchor points 36, 38 and 40 in the form of semicircular depressions defined on either side of an opening 42 in the anchor component. Referring to FIG. 7, it may be observed that lock control slide switch 24 has a corresponding tab 44 (one tab on each side of the control slide switch) that interacts with anchor points 36, 38 and 40. A slot 45 is defined in the lock control slide switch so as to allow sliding engagement of the slide switch with the opening 42, while allowing the tabs 44 to interact with the anchor points. The slot and the wider configuration of the lock control slide switch above and below the slot allows the slide switch to be retained by the anchor component while allowing sliding of the slide switch.

Figure 8:
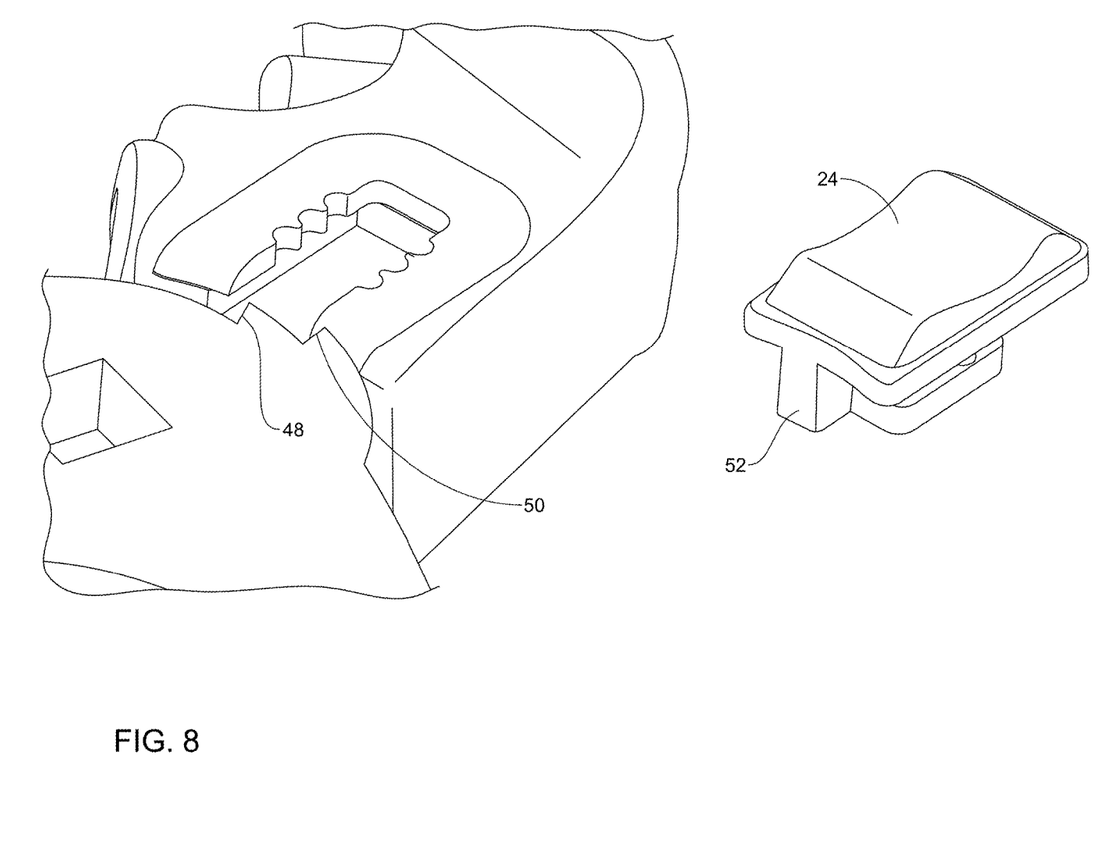
FIG. 8 is a further partial exploded perspective view showing interaction of the lock control with the opening adjustment components of the pruner or secateur.

Referring now to FIG. 8, a partial exploded perspective view showing interaction of the lock control with the opening adjustment components of the pruner or secateur, the pruner or secateur blade 18 includes first and second control points 48 and 50 defined on the lower curved portion of the blade, and lock control slide switch 24 has an engagement tab 52 to interact with control points 48 and 50.

In operation, when control slide switch 24 is moved the maximum amount in direction 30, while the pruner or secateur is fully closed, engagement tab 52 fits up against the portion of blade 18 next to control point 48, so that the shoulder of engagement tab 52 is abutting against inner surface 56 of control point 48, effectively locking the pruner or secateur in a closed position. At the same time, tabs 44 of the control slide switch 24 are engaged in anchor point 40, securing the control slide switch in position, and the puner will appear as in FIG. 1, locked in a fully closed.

To adjust the pruner or secateur, a user will slightly depress the handles 12, 14 together to release the pressure of surface 56 against engagement tab 52, and slide the control slide switch 24 in the direction of arrow 32. This causes the tabs 44 to disengage with anchor points 40 and move to anchor points 38. Engagement tab 52 is thereby moved away from the blade. If the user stops moving control slide switch 24 at this point, then the tabs 44 will engage with anchor points 38 and, on release of the handles, the pruner or secateur will be able to open until such time as engagement tab 52 then interacts with control point 50. The shoulder of engagement tab 52 will then interact with the inner face 58 of control point 50, thereby stopping the pruner or secateur from opening further. Thus the pruner or secateur is operable to open up to the 'half open' position of FIG. 2. This configuration may be used, for example, for pruning of smaller size items.

On further moving of control slide switch 24 in the direction of arrow 32 (suitably while depressing the pruner or secateur handles together slightly), tabs 44 will disengage from 38 and move to engage with 36. In this position, engagement tab 52 of the control slide switch 24 is free from engagement with either of control points 48 or 50, so on release of the handles, the pruner or secateur will be able to open fully as in FIG. 3. This configuration may be used, for example, for pruning of larger size items.

Figure 9:
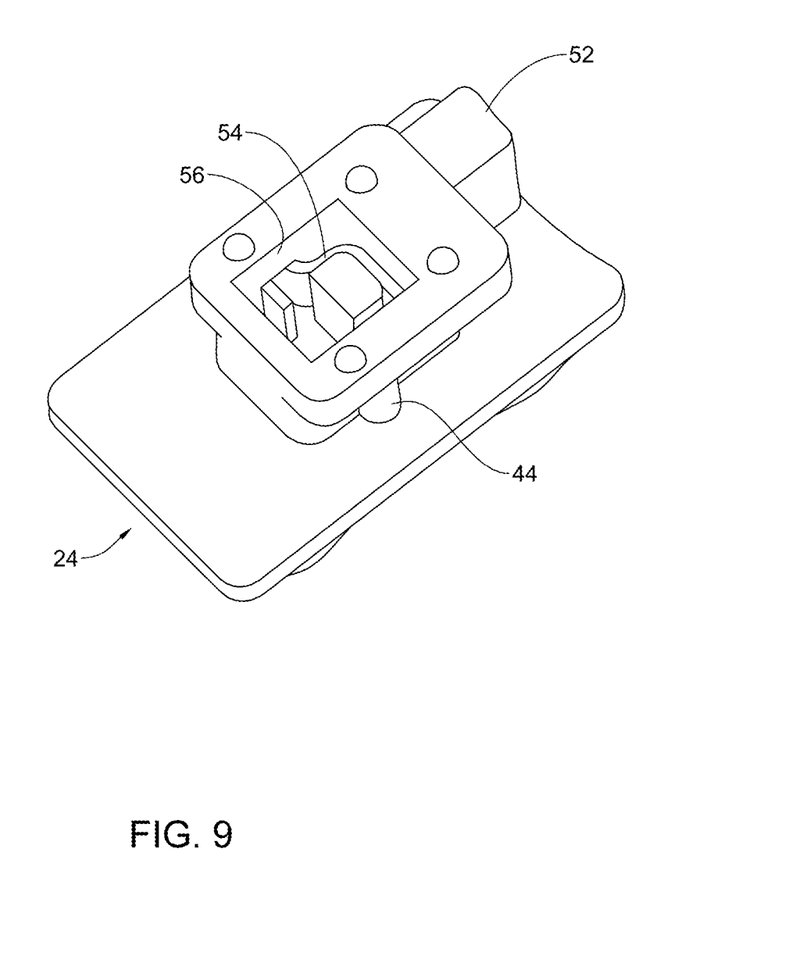
FIG. 9 is a bottom perspective view of the lock control slide switch.

Referring to FIG. 9, a bottom view of the control slide switch 24 removed from the pruner or secateur, the tabs 44 are defined as projections from a spring member 54 held within a cavity 56 defined in the control slide switch. As the control slide switch is moved, the spring member can flex to slightly retract tabs 44 to allow movement of the control slide switch, but, by the bias of the spring, encouraging the tabs 44 to expand and engage with the anchor points. By this operation, the control slide switch can be moved but holds its position when released.

Figure 10:
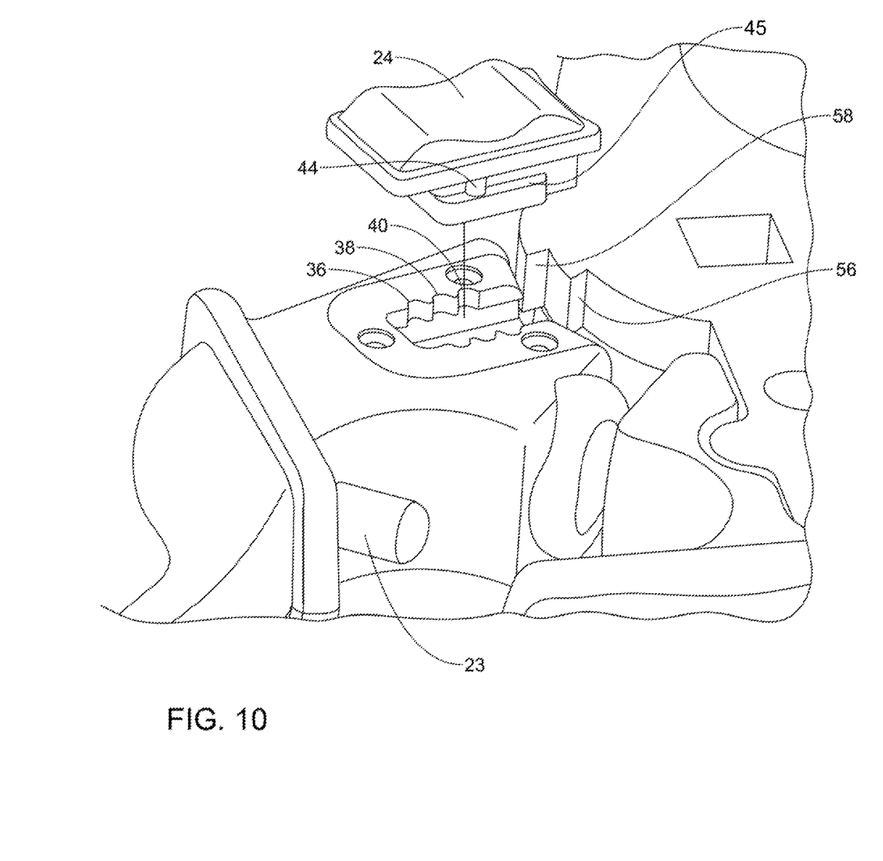
FIG. 10 is an exploded perspective view illustrating the lock control slide switch placement and interaction.
Figure 11:
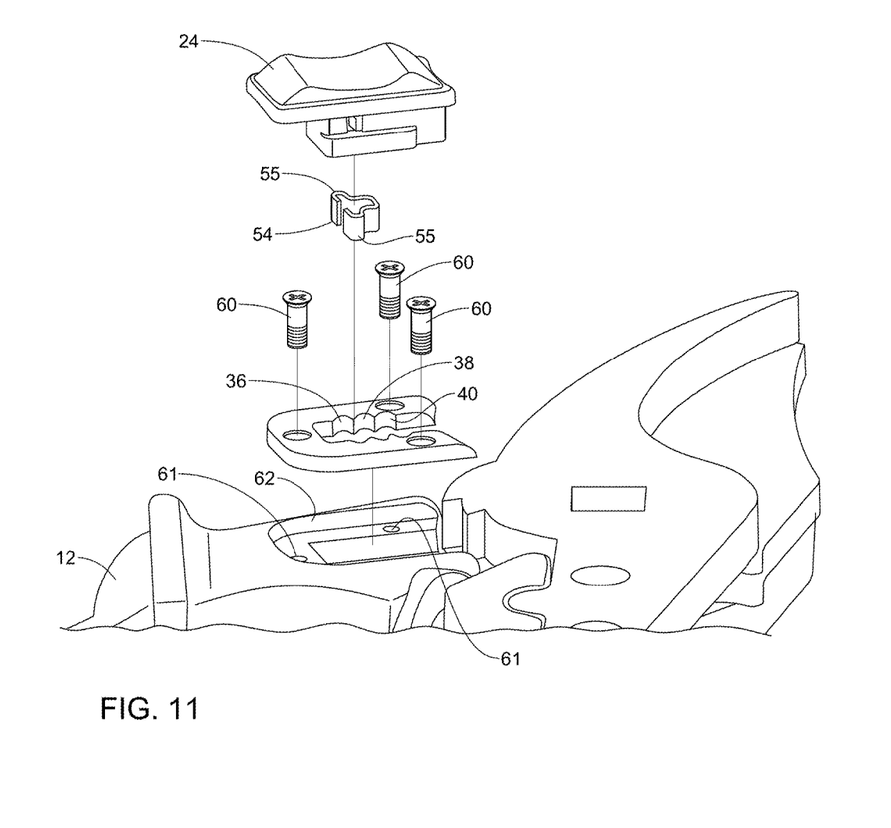
FIG. 11 is an exploded perspective view illustrating how the lock control slide switch, anchor component and pruner or secateur handle cooperate.

Referring to FIGS. 10 and 11, exploded perspective views illustrating the lock control slide switch, anchor component placement and interaction, a recessed portion 62 is formed in handle 12 to receive anchor component 34 therein, secured in position by machine screws 60, three such screws used in the illustrated embodiment. Corresponding threaded screw holes 61 are appropriately formed in the handle 12 to receive the screws. Control slide switch 24 is shown with spring member 54 removed. The spring member has curved wing members 55 that selectively engage anchor points 36, 38 and 40 in operation, to define the lock state.

While the illustrated embodiment shows three operational positions being provided, locked closed, half open and fully open, further anchor points and engagement tabs can be provided to define multiple levels of opening amounts that the pruner or secateur is capable of achieving. For a number n anchor points, n−1 control points are provided and thereby, n positions are defined for the pruner or secateur. The opening amounts can be evenly spaced, such as closed, ¼, ½, ¾, fully open, or can be uneven, such as closed, ¼, ¾, fully open. The amount of opening and number of positions can be varied depending on the expected user needs and hand size.

While the illustrated embodiment shows 3 operational positions being provided, locked closed, half open and fully open, further anchor points and engagement tabs can be provided to define multiple levels of opening amounts that the pruner or secateur is capable of achieving. For a number n anchor points, n−1 control points are provided and thereby, n positions are defined for the pruner or secateur. The opening amounts can be evenly spaced, such as closed, ¼, ½, ¾, fully open, or can be uneven, such as closed, ¼, ¾, fully open. The amount of opening and number of positions can be varied depending on the expected user needs and hand size.

Having an adjustable maximum opening amount allows cutting to be done without having to repeat a full opening/closing cycle. This contributes to longevity of field use for the device and improved ergonomics.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A multi-position lock for a pruning device comprising:
   a selector for selecting a degree of opening allowed for a blade mechanism for the pruning device comprising
      an anchor component with multiple anchor points;
      a slide switch having a cavity; and
      a spring member held in the cavity of the slide switch and having at least one tab protruding out of the cavity and selectively engaging the anchor points; and
   a stop member interacting with the selector for stopping opening movement of the blade mechanism.

2. The multi-position lock for a pruning device according to claim 1, wherein said stop member comprises a defined shoulder portion for interacting with a corresponding shoulder portion on said selector.

3. The multi-position lock for a pruning device according to claim 1, wherein said stopping opening movement is defined as one of fully closed, partially open or fully open.

4. The multi-position lock for a pruning device according to claim 1, wherein said stopping opening movement is defined as one of fully closed, half open or fully open.

5. The multi-position lock for a pruning device according to claim 1, wherein said stopping opening movement is defined as one of fully closed, half open, other than fully closed or half open or fully open, or fully open.

6. The multi-position lock for a pruning device according to claim 1, wherein said stopping opening movement is defined as one of closed, ¼ open, ½ open, ¾ open, or fully open.

7. The multi-position lock for a pruning device according to claim 1, wherein said stopping opening movement is defined as one of closed, ¼ open, ¾ open, or fully open.

8. The multi-position lock for a pruning device according to claim 1, wherein said stopping opening movement is defined as one of closed, ⅓ open, ⅔ open, or fully open.

9. The multi-position lock for a pruning device according to claim 1, wherein said stopping opening movement is defined as evenly spaced positions between fully closed and fully open.

10. The multi-position lock for a pruning device according to claim 1, wherein said stopping opening movement is defined as unevenly spaced positions between fully closed and fully open.

11. The multi-position lock for a pruning device according to claim 1, wherein said spring member is a resilient sheet with at least one curved wing to form the said tab.

12. The multi-position lock for a pruning device according to claim 1, wherein said stop member comprises a plurality of control points for interacting with a corresponding shoulder portion on said selector.

\* \* \* \* \*